(12) United States Patent
Lee

(10) Patent No.: US 10,147,001 B2
(45) Date of Patent: Dec. 4, 2018

(54) ELECTRONIC APPARATUS AND CONTROL METHOD THEREOF

(71) Applicant: THINKWARE CORPORATION, Seongnam-si, Gyeonggi-do (KR)

(72) Inventor: Han Woo Lee, Seoul (KR)

(73) Assignee: THINKWARE CORPORATION, Seongnam-si (KR)

(*) Notice: Subject to any disclaimer, the term of this patent is extended or adjusted under 35 U.S.C. 154(b) by 536 days.

(21) Appl. No.: 14/673,298

(22) Filed: Mar. 30, 2015

(65) Prior Publication Data
US 2015/0278614 A1 Oct. 1, 2015

(30) Foreign Application Priority Data

Mar. 31, 2014 (KR) .................. 10-2014-0037762

(51) Int. Cl.
*G06K 9/00* (2006.01)
*B60W 30/12* (2006.01)
*B60W 50/14* (2012.01)
*G02B 27/01* (2006.01)

(52) U.S. Cl.
CPC ......... *G06K 9/00798* (2013.01); *B60W 30/12* (2013.01); *B60W 50/14* (2013.01); *G02B 27/01* (2013.01); *B60W 2050/146* (2013.01); *B60W 2550/20* (2013.01); *G02B 2027/014* (2013.01); *G02B 2027/0138* (2013.01); *G02B 2027/0141* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,790,403 A | * | 8/1998 | Nakayama | G05D 1/0246 340/435 |
| 2004/0016870 A1 | * | 1/2004 | Pawlicki | B60W 30/18 250/208.1 |
| 2007/0225914 A1 | * | 9/2007 | Kawazoe | G01C 21/3658 701/533 |
| 2011/0098919 A1 | * | 4/2011 | Irie | G01C 21/3658 701/533 |
| 2012/0296561 A1 | * | 11/2012 | Park | G01C 21/3635 701/119 |
| 2013/0293717 A1 | * | 11/2013 | Zhang | H04N 7/181 348/149 |
| 2014/0063251 A1 | * | 3/2014 | Kim | G06F 17/00 701/300 |

(Continued)

FOREIGN PATENT DOCUMENTS

WO WO 2013018962 A1 * 2/2013 ............. G06T 7/60

*Primary Examiner* — Janese Duley
(74) *Attorney, Agent, or Firm* — Novick, Kim & Lee, PLLC; Sang Ho Lee

(57) ABSTRACT

An electronic apparatus according to an embodiment of the present invention includes a communication unit configured to receive image data including a driving image of a vehicle, a driving line information generation module configured to identify a line region from the image data, and generate driving line information, corresponding to a currently-driving lane of the vehicle in the driving image, from image data corresponding to the identified line region, and a controller configured to perform necessary processing according to the driving line information.

16 Claims, 11 Drawing Sheets

(56) References Cited

U.S. PATENT DOCUMENTS

2014/0204212 A1\* 7/2014 Pawlicki .................. G06T 7/73
348/148
2014/0257686 A1\* 9/2014 Feldman ................. G06F 17/00
701/300

\* cited by examiner

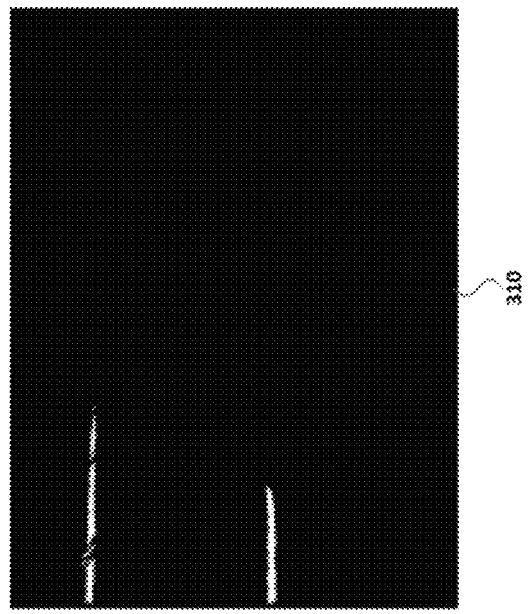
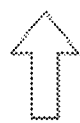
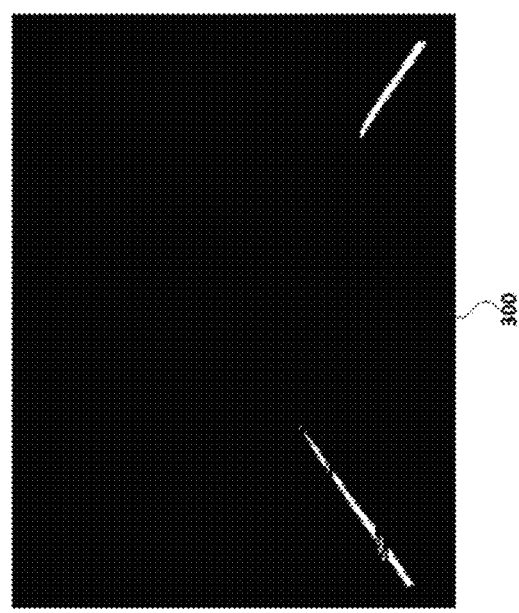
FIG. 7

| LINE POSITION | LINE TYPE | LINE COLOR |
| --- | --- | --- |
| LEFT | DASHED LINE | YELLOW |
| LEFT | DASHED LINE | WHITE |
| LEFT | DASHED LINE | BLUE |
| LEFT | SOLID LINE | YELLOW |
| LEFT | SOLID LINE | WHITE |
| LEFT | SOLID LINE | BLUE |
| RIGHT | DASHED LINE | YELLOW |
| RIGHT | DASHED LINE | WHITE |
| RIGHT | DASHED LINE | BLUE |
| RIGHT | SOLID LINE | YELLOW |
| RIGHT | SOLID LINE | WHITE |
| RIGHT | SOLID LINE | BLUE |

FIG. 8

| COUNTRY | LEFT-SIDED LINE | RIGHT-SIDED LINE | DRIVING LANE |
|---|---|---|---|
| KR | YELLOW SOLID LINE | WHITE DASHED LINE | LEFT-SIDED LANE |
| KR | YELLOW DASHED LINE | WHITE SOLID LINE | LEFT-SIDED LANE |
| KR | WHITE SOLID LINE | WHITE DASHED LINE | LEFT-SIDED LANE |
| KR | WHITE DASHED LINE | WHITE DASHED LINE | MIDDLE LANE |
| KR | WHITE SOLID LINE | WHITE SOLID LINE | MIDDLE LANE |
| KR | WHITE DASHED LINE | WHITE SOLID LINE | RIGHT-SIDED LANE |
| KR | WHITE DASHED LINE | YELLOW SOLID LINE | RIGHT-SIDED LANE |
| KR | WHITE SOLID LINE | YELLOW DASHED LINE | RIGHT-SIDED LANE |
| KR | WHITE DASHED LINE | YELLOW DASHED LINE | RIGHT-SIDED LANE |
| ... | ... | ... | ... |

FIG. 10

ELECTRONIC APPARATUS AND CONTROL METHOD THEREOF

CROSS-REFERENCE TO RELATED APPLICATIONS

This application claims priority from Korean Patent Application No. 10-2014-0037762, filed on Mar. 31, 2014, in the Korean Intellectual Property Office, the disclosure of which is incorporated herein by reference in its entirety.

BACKGROUND OF THE INVENTION

Field of the Invention

The present disclosure relates to an electronic apparatus and a control method thereof, and more particularly, an electronic apparatus, which is provided in a vehicle to perform line recognition and notification, and a control method thereof.

Description of the Related Art

What is the most important while a vehicle is driven is safe driving and protection from a traffic accident. For the purpose, safety devices, such as various auxiliary devices, seat belts, airbags and the like, are installed in the vehicle to perform a vehicle dynamic control, a function control of components of the vehicle, and the like.

In addition, the recent trend is that the vehicle is equipped with other devices, such as a black box and the like, which are located in the vehicle to store driving images of the vehicle and data transmitted from various sensors. Such images and data are used to find the exact cause of an accident of the vehicle when the accident happens. Portable terminals, such as smart phones and tablet PCs, can install therein a black box application or a navigation application, and thus are currently utilized as such devices for vehicle.

However, those devices for vehicle currently show low utilization of driving images. More specifically, even though driving images of the vehicle are obtained through a vision sensor, such as a camera mounted in the vehicle, an electronic apparatus of the vehicle merely displays or transmits the images or generates brief surrounding notification information, such as line departure or the like.

Also, a head-up display (HUD) or an augmented reality interface is currently on the rise as a newly released electronic apparatus for vehicle, but the utilization of the driving images of the vehicle is still limited to simple display or generation of brief notification information.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention has been invented to overcome the aforementioned problems. Therefore, an aspect of the present invention is to provide an electronic apparatus, capable of generating driving line information based on a driving image of a vehicle and performing an interface output and processing of various information based on the driving line information, and a method of operating the same.

In order to achieve the above object and other advantages, there is provided a method for controlling an electronic apparatus, the method including receiving image data including a driving image of a vehicle, identifying a line region from the image data, generating driving line information, corresponding to a currently-driving lane of the vehicle in the driving image, on the basis of image data corresponding to the identified line region, and performing necessary processing according to the driving line information.

In order to achieve the above object and other advantages, there is provided a method for controlling an augmented reality-based vehicle information notification apparatus, the method including receiving image data including a driving image of a vehicle, identifying a line region from the image data, generating driving line information related to the vehicle from image data of the identified line region, generating a line information interface overlaid on the augmented reality according to the driving line information, and outputting the line information interface through the augmented reality.

In order to achieve the above object and other advantages, there is provided an electronic apparatus including a communication unit configured to receive image data including a driving image of a vehicle, a driving line information generation module configured to identify a line region from the image data, and generate driving line information, corresponding to a currently-driving lane of the vehicle in the driving image, from image data corresponding to the identified line region, and a controller configured to perform necessary processing according to the driving line information.

In order to achieve the above object and other advantages, there is provided an augmented reality-based vehicle information notification apparatus, including a communication unit configured to receive image data including a driving image of a vehicle, a driving line information generation module configured to identify a line region from the image data, and generate driving line information related to the vehicle from image data of the identified line region, a controller configured to generate a line information interface overlaid on the augmented reality according to the driving line information, and an output unit configured to output the line information interface through the augmented reality.

In order to achieve the above object and other advantages, there is provided a storage medium having a program recorded therein, the program provided to execute in a computer the methods according to the embodiments of the present invention.

In accordance with an embodiment of the present invention, driving line information which corresponds to a currently-driving lane of a vehicle in a driving image can be generated from image data corresponding to a line region, and accordingly necessary processing can be performed.

This may enable performing of various information processing, including a line interface output and an augmented reality interface generation, on the basis of the driving line information.

Also, in accordance with an embodiment of the present invention, a currently-driving lane can be determined based on the driving line information, and the determined currently-driving lane can be guided to a driver, thereby assisting the driver.

In accordance with an embodiment of the present invention, an accurate lane change notification can be carried out on the basis of route information provided by a navigation device and the driving line information, thereby improving user convenience.

In addition, in accordance with an embodiment of the present invention, an appropriate lane change notification can be selectively carried out according to a type of each line at both sides of the currently-driving lane on the basis of the driving line information, thereby improving performance of the lane change notification and providing much more information.

BRIEF DESCRIPTION OF THE DRAWING FIGURES

The above and/or other aspects of the present invention will be more apparent by describing certain exemplary embodiments of the present invention with reference to the accompanying drawings, in which:

FIGS. 5 to 7 are views illustrating sequential steps of an image processing process according to a method for controlling an electronic apparatus in accordance with one exemplary embodiment of the present invention;

FIG. 8 is an exemplary view illustrating driving line information generated by an electronic apparatus in accordance with one exemplary embodiment of the present invention;

Figure 9:
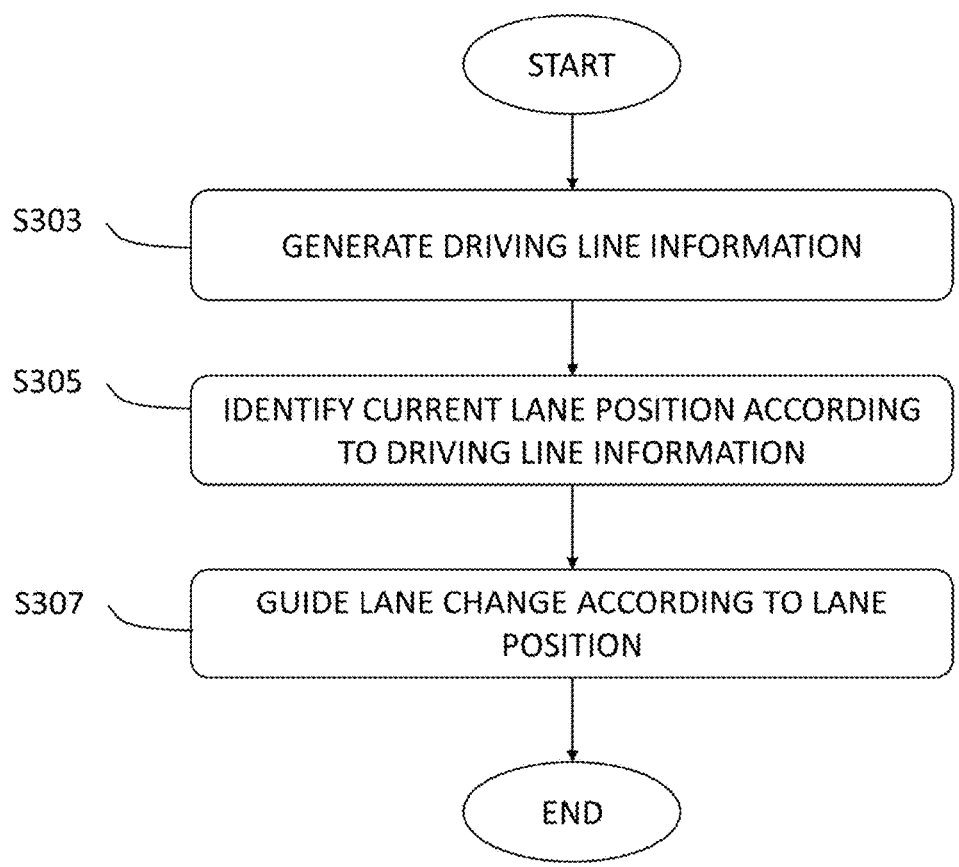
Figure 11:
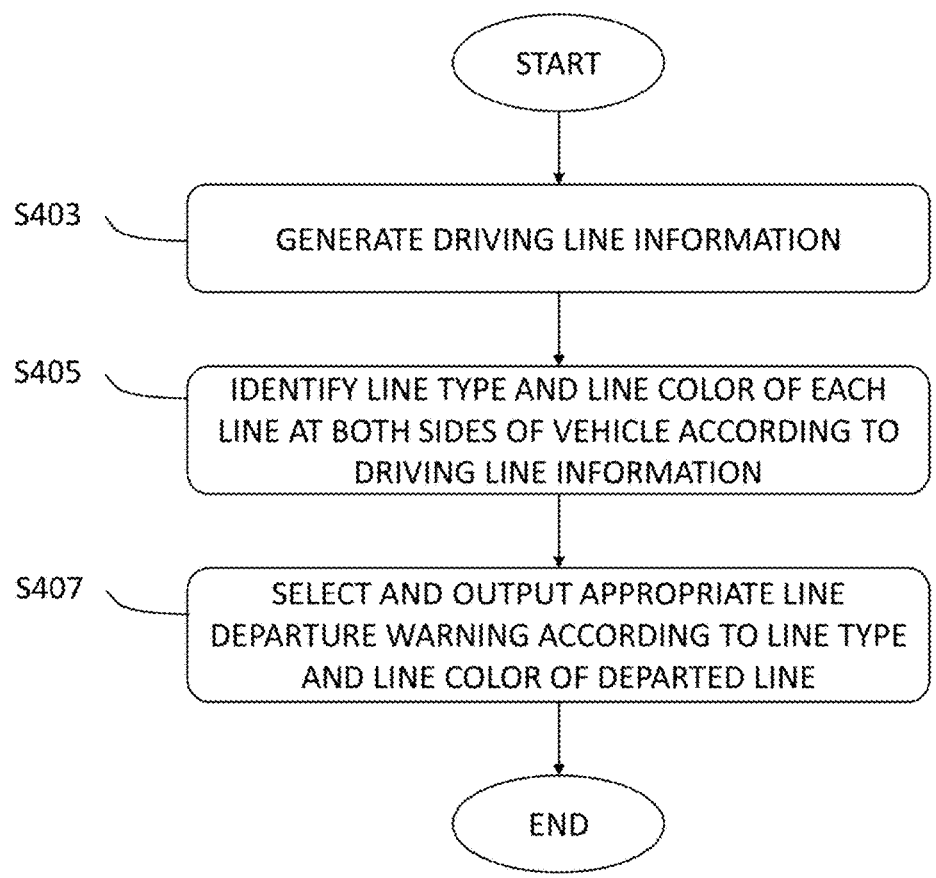

FIGS. 9 and 10 are views illustrating a method of guiding a lane change based on driving line information in an electronic apparatus in accordance with one exemplary embodiment of the present invention; and FIG. 11 is a flowchart illustrating a method of notifying a line departure based on driving line information in an electronic apparatus in accordance with one exemplary embodiment of the present invention.

DETAILED DESCRIPTION OF THE EXEMPLARY EMBODIMENTS

The following description only illustrates the principles of the present invention. Therefore, those skilled in the art can derive various devices that implement the principles of the present invention and are included in the concept and scope of the present invention even if the devices are not explicitly described or illustrated herein. It should be understood that the conditional terms and embodiments of the present disclosure are provided so that the concept of the present invention can be understood and it should be understood that the present invention is not limited to the specified embodiments and states.

Further, it should be understood that not only the principles, aspects, and embodiments of the present invention but also all detailed descriptions of specific embodiments include structural and functional equivalents thereof. Further, it should be understood that these equivalents include not only published equivalents but also equivalents that will be developed, i.e. all devices designed to perform the same functions regardless of structures.

Therefore, for instance, it should be understood that the block diagrams of the present disclosure illustrate conceptual aspects of exemplary circuits that realize the principles of the present invention. Similarly, it should be understood that all flowcharts, state transition diagrams, and pseudo codes represent various processes that are performed by a computer or processor regardless of whether the flowcharts, state transition diagrams, and pseudo codes can be substantially indicated in a computer-readable medium or the computer or processor is explicitly illustrated.

Further, the terms suggested as a processor, control, or similar concept thereof should not be interpreted by exclusively referring to hardware capable of executing software, but should be interpreted to include digital signal processor (DSP) hardware and ROM, RAM, and non-volatile memory for storing software. Other well-known hardware may be included.

In the claims, the elements expressed as means for performing the functions described in the detailed description include a combination of circuits for performing the functions or all methods for performing functions including all types of software including firmware/micro code. The elements are connected to appropriate circuits to execute the functions, thereby performing the functions. Since the present invention defined by the claims combines functions provide by listed means in a manner required by the claims, it should be understood that any means capable of providing the functions are equivalent to those of the present disclosure.

The above-described purpose, feature, and advantage will be clarified by the following detailed descriptions which are related to the accompanying drawings. Accordingly, the technical spirit of the present invention can be easily embodied by those skilled in the art to which the present invention pertains. Furthermore, when it is determined that a specific description for a well-known technology related to the present invention may unnecessarily make the purport of the present invention ambiguous in the detailed descriptions of the present invention, the specific description will be omitted.

Hereafter, exemplary embodiments of the present invention will be described in detail with reference to the accompanying drawings.

Figure 1:
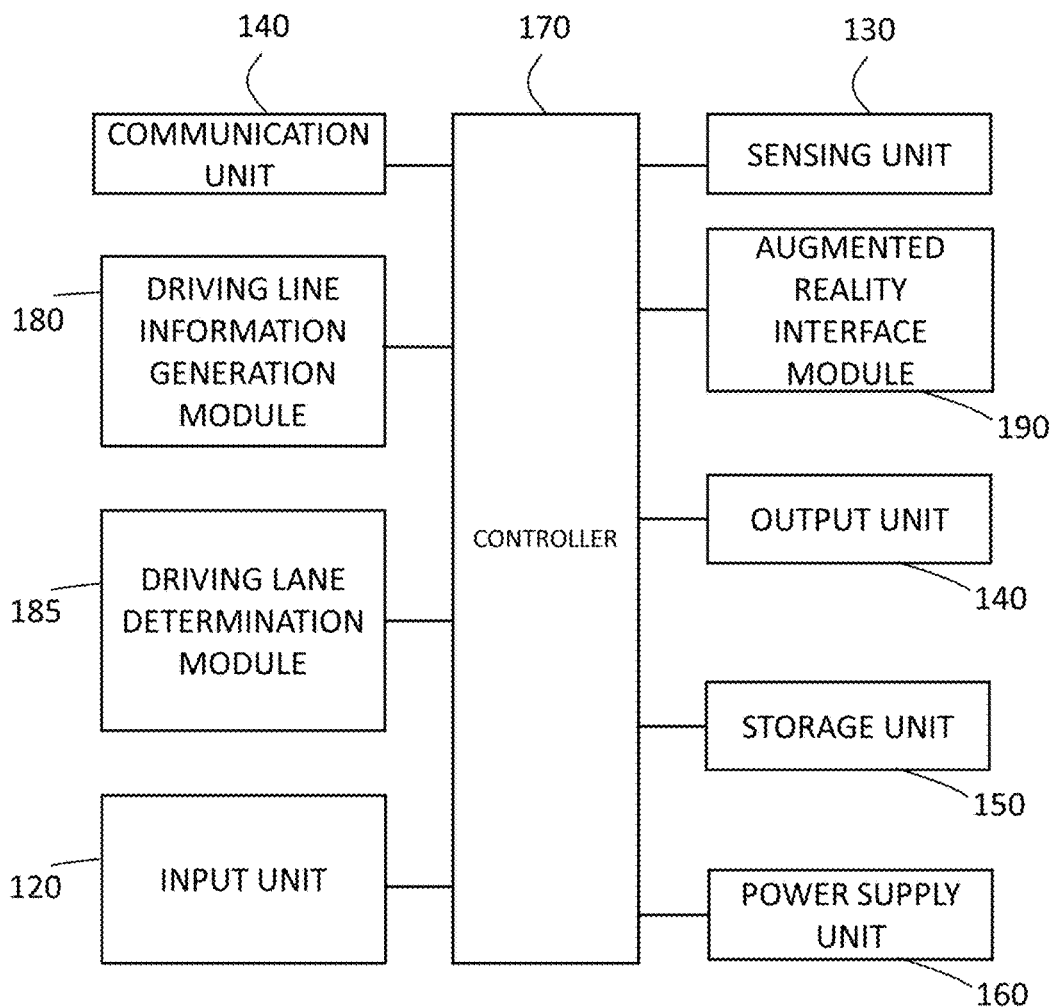
FIG. 1 is a block diagram schematically illustrating an electronic apparatus in accordance with one exemplary embodiment of the present invention.

FIG. 1 is a block view schematically illustrating an electronic apparatus in accordance with one embodiment disclosed herein.

An electronic apparatus (or an electronic device) 100 to be explained herein can be implemented into various types of apparatuses which are equipped or mounted in a vehicle. For example, the electronic apparatus 100 may be implemented into various apparatuses, such as a navigation device which navigates up to a predetermined point, a black box which captures surroundings of the vehicle and stores or transmits the captured image information, a smart phone, a tablet computer, a notebook computer, a personal digital assistant (PDA), a portable multimedia player (PMP), and the like.

The electronic apparatus 100 according to the one embodiment disclosed herein to perform such operations may be implemented as a navigation device for vehicle, a black box for vehicle or an augmented reality system, for example.

When the electronic apparatus 100 is implemented as the navigation device for vehicle or the augmented reality system, the electronic apparatus 100 may refer to a system which notifies a driver or a passenger of the vehicle of various data associated with driving and maintenance of the vehicle. In this instance, the electronic apparatus 100 may mean the very navigation device in a narrow sense, and may be understood as a concept including various types of electronic devices cooperatively operating with the electronic apparatus 100 in a wired or wireless manner in a broad sense.

This may mean that the electronic apparatus 100 can be connected to various electronic devices, which can supplement and improve the function of the navigation device for vehicle, so as to construct an integrated system. An electronic device which can construct a premise system may be another mobile terminal, a remote controller or the like which is accessible to a mobile communication network.

When the electronic apparatus 100 is implemented as the black box for vehicle, the electronic apparatus 100 may be the very black box or integrated with a navigation device.

When the electronic apparatus 100 is implemented as the black box for vehicle, the electronic apparatus 100 may exchange signals with a navigation device for vehicle or a mobile terminal and store data required for handling a vehicle accident. For instance, when an accident happens while the vehicle is driven, image data stored in the electronic apparatus 100 may be analyzed, and the analyzed results may be used to determine the cause of the accident and an accidental degree. Also, upon being connected to the navigation device for vehicle or another mobile terminal, the electronic apparatus 100 may utilize various types of data stored in the navigation device for vehicle or the another mobile terminal. For example, an image obtained by the electronic apparatus 100 may match map data stored in a mobile terminal, so as to enhance efficiency of the electronic apparatus 100.

When the electronic apparatus 100 is implemented as the black box for vehicle, data associated with the vehicle may be obtained while the vehicle is driven or stopped. That is, the electronic apparatus 100 may enable capturing of images not only during movement of the vehicle but also in a stopped state of the vehicle. Quality of the image obtained by the electronic apparatus 100 may be uniform or changeable. For example, images may be controlled to have high quality before and after an occurrence of an accident and low quality in a normal state. This may result in minimizing a storage space required and storing essential images.

An entire system network including the electronic apparatus 100 according to the one embodiment disclosed herein may perform communication through Bluetooth, radio frequency identification (RFID), infrared data association (IrDA), ultra wideband (UWB), Zigbee and the like.

Also, the electronic apparatus 100 according to the embodiment disclosed herein may generate driving line information by analyzing captured driving images, determine a driving lane, and provide the determined data to a user through a line information interface.

Hereinafter, the configuration and operations of the electronic apparatus 100 will be described in more detail.

Referring to FIG. 1, the electronic apparatus 100 according to the one embodiment disclosed herein may include a communication unit 110, an input unit 120, a sensing unit 130, an output unit 140, a storage unit (or memory) 150, a power supply unit 160, a controller 170, a driving line information generation module 180, a driving lane determination module 185, and an augmented reality (AR) interface module 190.

The communication unit 110 may be configured for the electronic apparatus 100 to perform communication with other devices. The communication unit 110 may include all or part of a location data module, a wireless Internet module, a broadcast transmission/reception module, a short-range communication module, and a wired communication module. For instance, the communication unit 110 may receive image data including a driving image of a vehicle from another device or a camera module connected with the electronic apparatus 100.

The location data module is a module which acquires location data through a global navigation satellite system (GNSS). The GNSS refers to a navigation system which calculates a location of a receiving terminal using an electric wave signal received from a satellite. Examples of the GNSS may include, according to an operating entity, global positioning system (GPS), Galileo, global orbiting navigational satellite system (GLONASS), COMPASS, Indian regional navigational satellite system (IRNSS), quasi-zenith satellite system (QZSS), and the like. The location data module of the electronic apparatus 100 according to the one embodiment may acquire location data by receiving a GNSS signal which is serviced in a region where the electronic apparatus 100 is used.

The wireless Internet module is a module which acquires or transmits data by accessing a wireless Internet. Examples of the wireless Internet which is accessible through the wireless Internet module may include wireless LAN (WLAN), wireless broadband (Wibro), world interoperability for microwave access (Wimax), high speed downlink packet access (HSDPA), and the like.

The short-range communication module is a module for short-range or near field communication. The short-range communication module, as aforementioned, may perform communication through Bluetooth, radio frequency identification (RFID), infrared data association (IrDA), ultra wideband (UWB), ZigBee and the like.

The wired communication module is an interface module for connecting the electronic apparatus 100 to another device in a wired manner. The wired communication module may be a USB module for communication through a USB port, or a cable interface for transmission of other data signals.

The electronic apparatus 100 according to the one embodiment and other embodiments may communicate with other devices through the short-range communication module or the wired communication module. In addition, when communicating with a plurality of devices, the electronic apparatus may communicate with one device through the short-range communication module, and another one through the wired communication module. Accordingly, in case of an electronic apparatus which does not include a camera function according to one embodiment, the electronic apparatus may receive driving images captured by a black box through the communication unit 110, or receive driving images captured by a separate camera which is installed to face the front of a vehicle.

The input unit 120 is a device which converts a physical input applied from the exterior of the electronic apparatus 100 into a specific electric signal. The input unit 120 may include all or part of a user input module and a microphone module.

The user input module is a module which allows a user to apply a touch input, a push input or the like. Here, the user input module may be implemented by using at least one of various types of buttons, a touch sensor receiving a touch input and a proximity sensor receiving a proximate motion.

The microphone module is a module which receives user's voice and internal and external sounds of the vehicle.

The sensing unit 130 is a device which can sense a current state of the electronic apparatus 100. The sensing unit 130 may include all or part of a motion sensing module and an optical sensing module.

The motion sensing module may sense a motion of the electronic apparatus 100 on a three-dimensional (3D) space. The motion sensing module may include a triaxial geomagnetic sensor and a triaxial acceleration sensor. Motion data acquired through the motion sensing module and location data acquired through the location data module may be combined with each other so as to calculate a more accurate track of the vehicle with the electronic apparatus 100 attached thereto.

The optical sensing module is a module which measures ambient illuminance of the electronic apparatus 100. By using illuminance data acquired through the optical sensing module, brightness of a display module included in the output unit 140 can change to correspond to ambient brightness.

The output unit 140 is a device which outputs data of the electronic apparatus 100. The output unit 140 may include all or part of a display module and an audio output module.

The display module is a module which outputs data visually recognized by the electronic apparatus 100. The display module may be implemented as a display unit disposed on a front surface of a housing of the electronic apparatus 100. Here, the display module may be formed integrally with the electronic apparatus 100 to output visually-recognizable data, or installed, like a head up display (HUD), separate from the electronic apparatus 100, so as to output the visually-recognizable data.

The audio output module is a module which outputs data audibly recognized by the electronic apparatus 100. The audio output module may be implemented as a speaker, which outputs data necessary to be notified to a user of the electronic apparatus 100 in the form of sound.

The storage unit 150 is a device which stores data required for the operation of the electronic apparatus 100 and data generated by the operation. The storage unit 150 may be an embedded memory of the electronic apparatus 100 or a detachable memory. The data required for the operation of the electronic apparatus 100 may include an OS, a region information table, driving lane information, a route search application, a map and the like. Also, the data generated by the operation of the electronic apparatus 100 may include a driving line information table, a line information interface and the like.

The power supply unit 160 is a device which supplies power required for the operation of the electronic apparatus 100 or an operation of another device connected to the electronic apparatus 100. The power supply unit 160 may be a device which receives power from an embedded battery of the electronic apparatus 100 or an external power source, such as a vehicle. Also, the power supply unit 160 may be implemented as a wired communication module or a wireless communication module according to a method of receiving power supplied.

The controller 170 is a device which outputs a control signal for controlling various operations of the electronic apparatus 100. In addition, the controller 170 may output a control signal for controlling another device connected to the electronic apparatus 100.

Specifically, according to an embodiment disclosed herein, the controller 170 may control the driving line information generation module 180 and the driving lane determination module 185, to identify a line region from image data received, to generate driving line information corresponding to a lane, along which the vehicle is currently driven in the driving image, on the basis of image data corresponding to the identified line region, and to perform required processing according to the driving line information.

In more detail, the driving line information generation module 180 may identify a line region from image data, which includes a driving image received in the controller 170, and generate driving line information corresponding to each line located at both sides of a currently-driving lane of the vehicle from the line region. The driving line information may include at least one of line type information and line color information corresponding to each line located at the both sides of the currently-driving lane of the vehicle.

Also, in order to generate the driving line information, the driving line information generation module 185 may convert the image data corresponding to the line region into a binary coded value, and acquire the line type information from the binary-coded image data.

Also, the driving line information generation module 180 may analyze the binary-coded image data using at least one of time continuity information and velocity information both related to the lines, and accordingly identify whether the type of each line at the both sides of the currently-driving lane of the vehicle is a solid line or a dashed line. The driving line information generation module 180 may then extract color information corresponding to each line whose type has been identified from the image data, and generate the extracted line color information as the driving line information.

Meanwhile, the driving lane determination module 185 may identify a position of a lane, along which the vehicle is currently drive in the driving image, on the basis of the driving line information under the control of the controller 170.

Here, the driving line information may refer to information indicating each of both lines forming the currently-driving lane of the vehicle, and the driving lane may be decided according to the driving line information.

Also, the driving lane may refer to a relative lane location, which is recognized based on a center line, for example, the driving lane may be a left lane (passing lane), a middle lane or a right lane. Even if determined based on the same driving line information, the driving lane decided by the driving lane determination module 185 may differ according to traffic regulations of each country. Therefore, the driving lane determination module 185 may decide a current driving lane based on preset country information or a lane decision table.

The driving lane determination module 185 may also transfer the decided driving lane information to the controller 170.

The controller 170 accordingly performs required processing based on the driving lane information, and output the processed result through the output unit 140.

For example, the controller 170 may output lane guide information, which is generated based on the lane position determined in the driving lane determination module 185, through the output unit 140. When the electronic apparatus 100 provides a navigation function of the vehicle, the controller 170 may output a lane change notification according to a route up to a destination and the determined lane position. When a predetermined distance or less is left up to a left turn or right turn guide point, the controller 170 may determine whether or not a left turn or a right turn is allowed on a current lane, and provide the determination result to the user through the lane change notification.

As another example, the controller 170 may select an appropriate line departure warning according to type of lines at both sides of the driving lane of the vehicle, identified based on the driving line information, and output the selected warning to the user. When the electronic apparatus 100 provides a line departure warning function, the controller 170 may provide a different type of warning according to the type and color of a departed line. For example, the controller 170 may select and output a different type of warning image or sound when the vehicle violates the center line, when the vehicle violates a white solid line, when the vehicle violates a white dashed line, or when the vehicle violates a blue line.

When the electronic apparatus 100 performs an augmented reality-based vehicle information notification, the controller 170 may generate a line information interface by cooperating with the augmented reality interface module 190, and output the generated line information interface through the output unit 140. The augmented reality may be provided through an HUD using a windshield of a vehicle or through image overlaying using a separate image output device. The augmented reality interface module 190 may generate such reality image or an interface image overlaid on glass. Accordingly, an augmented reality navigation device or vehicle infotainment system can be implemented.

The augmented reality interface module 190 may generate the line information interface overlaid on the augmented reality, according to the driving line information generated by the driving lane generation module 180 or the lane information determined by the driving lane determination module 185.

The controller 170 may set a position or region for displaying the line information interface through the augmented reality interface module 190, and control the output unit 140 to output the line information interface in a manner of overlaying the line information interface on the augmented reality. The controller 170 may perform the aforementioned lane change notification or the line departure warning through the line information interface overlaid on the augmented reality.

Figure 2:
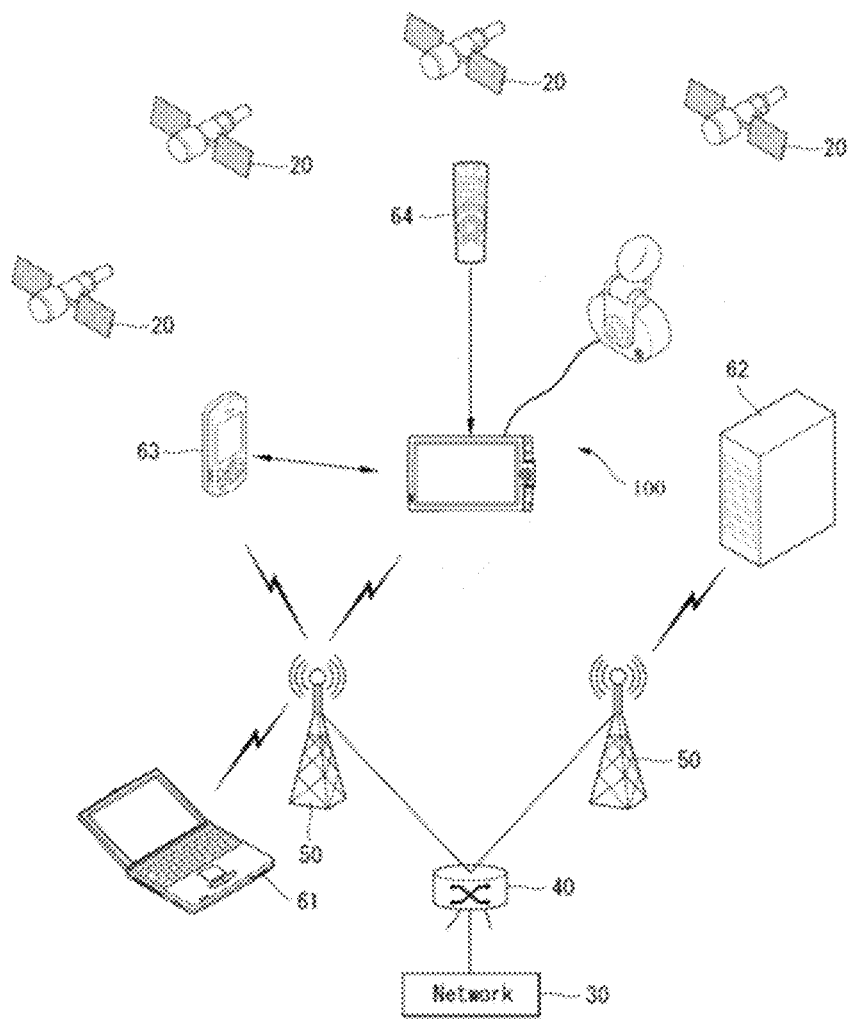
FIG. 2 is a view illustrating a system network connected with an electronic apparatus in accordance with one exemplary embodiment of the present invention.

FIG. 2 is a view illustrating a system network connected with an electronic apparatus in accordance with one exemplary embodiment of the present invention.

As illustrated in FIG. 2, the electronic apparatus 100 according to the one embodiment disclosed herein may be implemented as various apparatuses equipped in a vehicle, such as a black box, or other augmented reality interface providing apparatuses for vehicle. Also, the electronic apparatus 100 may be accessible to various communication networks and other electronic devices 61 to 64.

The electronic apparatus 100 may cooperate with the GPS module according to electric wave signals received from satellites 20, to calculate a current position and a current time zone.

Each satellite 20 may transmit an L-band frequency with a different frequency band. The electronic apparatus 100 may calculate the current position based on a time which is taken for the L-band frequency sent from each satellite 20 to reach the electronic apparatus 100.

Meanwhile, the electronic apparatus 100 may wirelessly access a network 30 through the communication unit 110 via a control station (ACR) 40, a base station (RAS) 50 and the like. When the electronic apparatus 100 accesses the network 30, the electronic apparatus 100 may be accessible indirectly to other electronic devices 61 and 62, which have accessed the network 30, so as to exchange data with the other electronic devices 61 and 62.

The electronic apparatus 100 may also access the network 30 indirectly through another electronic device 63 which has a communication function. For example, when the electronic apparatus 100 is not provided with a module for accessing the network 30, the electronic apparatus 100 can perform communication with the another electronic device 63 having the communication function by use of a short-range communication module and the like.

Figure 3:
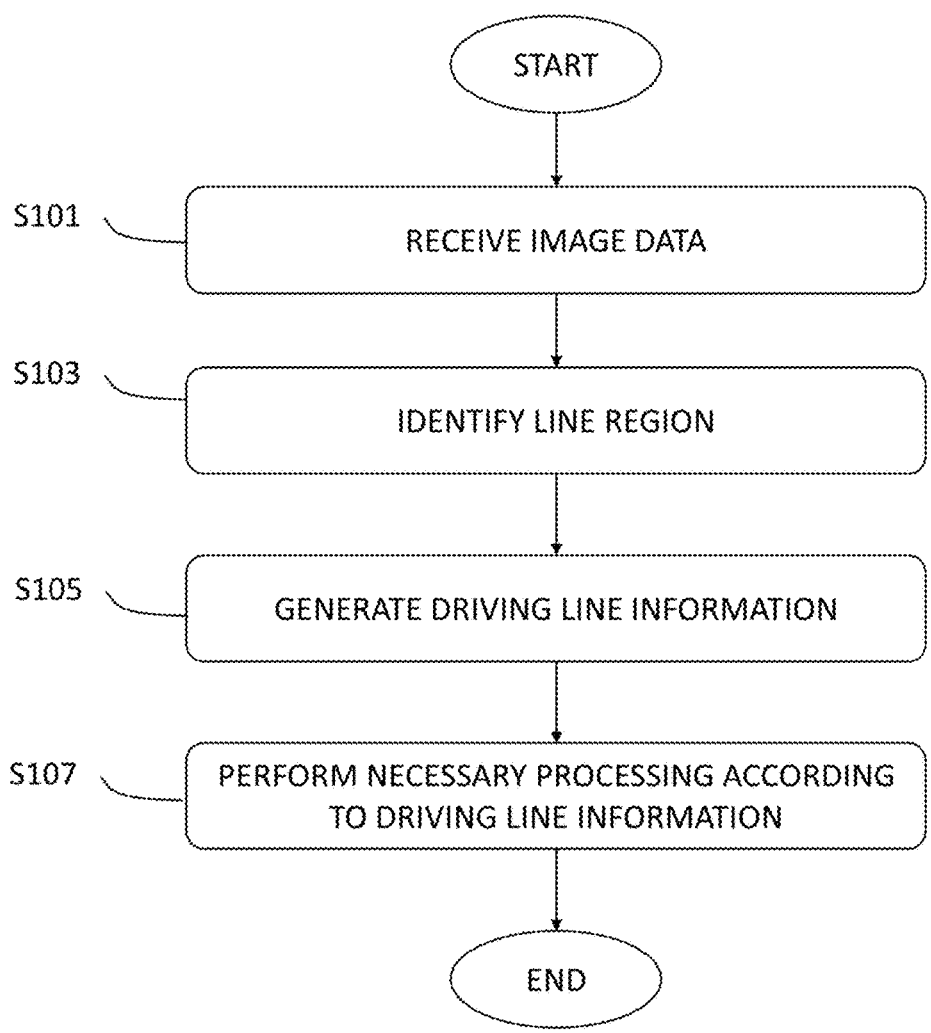
FIG. 3 is a flowchart illustrating a method for controlling an electronic apparatus in accordance with one exemplary embodiment of the present invention.

FIG. 3 is a flowchart illustrating a method for controlling an electronic apparatus in accordance with one exemplary embodiment of the present invention.

As illustrated in FIG. 3, first, the electronic apparatus 100 receives image data (S101).

The image data may include a driving image of a specific vehicle. The driving image of the vehicle may include an image captured by a camera module installed in the electronic apparatus 100, or an image captured by another device. The controller 170 may receive the image data through the communication unit 110 or directly through a separate interface.

For example, a captured driving image may refer to a red, green and blue (RGB) color image. Also, the driving image may include a front image of the vehicle, which is acquired through a camera mounted at a location facing a windshield (front glass) of the vehicle.

The electronic apparatus 100 identifies a line region from the image data (S103).

The driving line information generation module 180 may identify the line region from a driving image of the image data. To this end, the driving line information generation module 180 may convert the driving image into a gray image, perform a line detection algorithm, and decide a region, in which each line located at both sides of the currently driven vehicle can be recognized, as the line region.

The electronic apparatus 100 generates driving line information by analyzing image data corresponding to the identified line region (S105).

The driving line information generation module 180 may analyze line pattern information and line color information relating to the detected line region, thereby generating the driving line information corresponding to each line. The driving line information may include at least one of line type information and line color information corresponding to each line located at both sides of the currently driven vehicle.

The electronic apparatus 100 performs necessary processing according to the driving line information (S107).

The controller 170 may perform a lane change notification, a line departure warning or a line information notification through an augmented reality interface, according to the generated driving line information. For this, the driving lane determination module 185 may determine a driving lane identified from the driving line information and transmit the determination result to the controller 170.

Hereinafter, description will be given in more detail of a process of acquiring the driving line information in the method of controlling the electronic apparatus 100, with reference to FIGS. 4 to 7.

Figure 4:
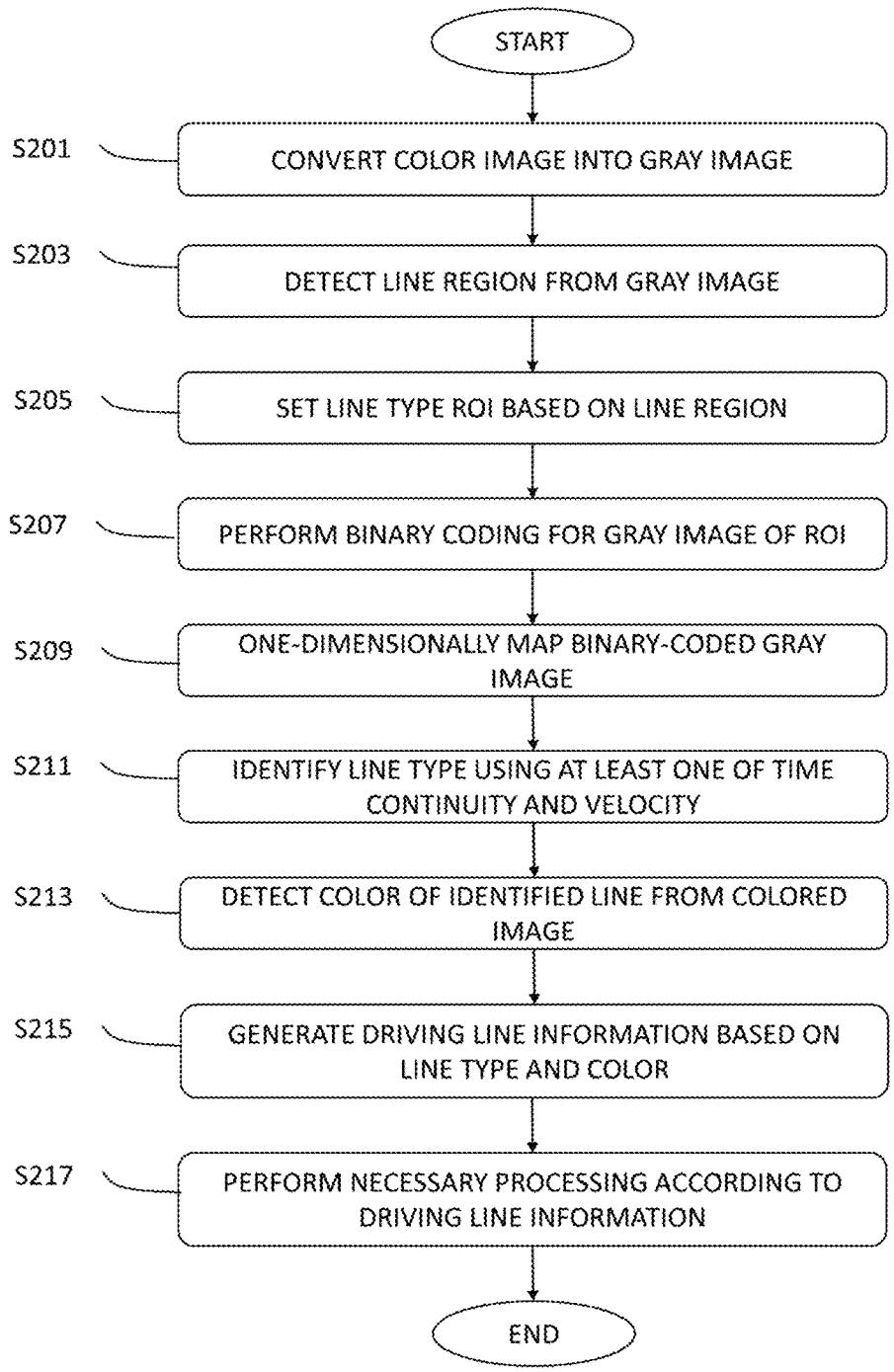
FIG. 4 is a flowchart illustrating in more detail a method for controlling an electronic apparatus in accordance with one exemplary embodiment of the present invention.

FIG. 4 is a flowchart illustrating in more detail a method for controlling an electronic apparatus in accordance with one exemplary embodiment of the present invention.

As illustrated in FIG. 4, the electronic apparatus 100 according to the one embodiment disclosed herein converts received color image data into a gray image (S201), and detects a line region from the converted gray image (S203).

The driving line information generation module 180 may extract a region for detecting lines from the captured driving image. Also, the driving line information generation module 180 may have a trouble in the line detection when a shadow interferes with a part of a road. To minimize the interference by the shadow, the driving line information generation module 180 may perform brightness compensation for an original driving image.

The driving line information generation module 180 may detect a region where lines can be present as the line region according to a predetermined camera position or a camera-installed angle. For example, the driving line information generation module 180 may decide the line region based on a position at which a line can be started. Also, the driving line information generation module 180 may estimate a starting position of the line region and a length of the line region on the basis of a lane width (the maximum width between a left-sided line region and a right-sided line region) within the driving image and a viewing angle of the camera.

The driving line information generation module 180 may also convert the gray image corresponding to the line detection region into an edge image, and detect the line region based on a position of a straight line extracted from the converted edge image. In more detail, the driving image may be converted into an edge image through various well-known algorithms. The edge image may include edges indicating a plurality of straight lines. Here, the driving line information generation module 180 may recognize positions of the detected straight lines as lines. Also, the driving line information generation module 180 may decide the line region on the basis of a position of a straight line having a predetermined line width with respect to a driving direction of the vehicle, among a plurality of straight line candidates.

Figure 5:
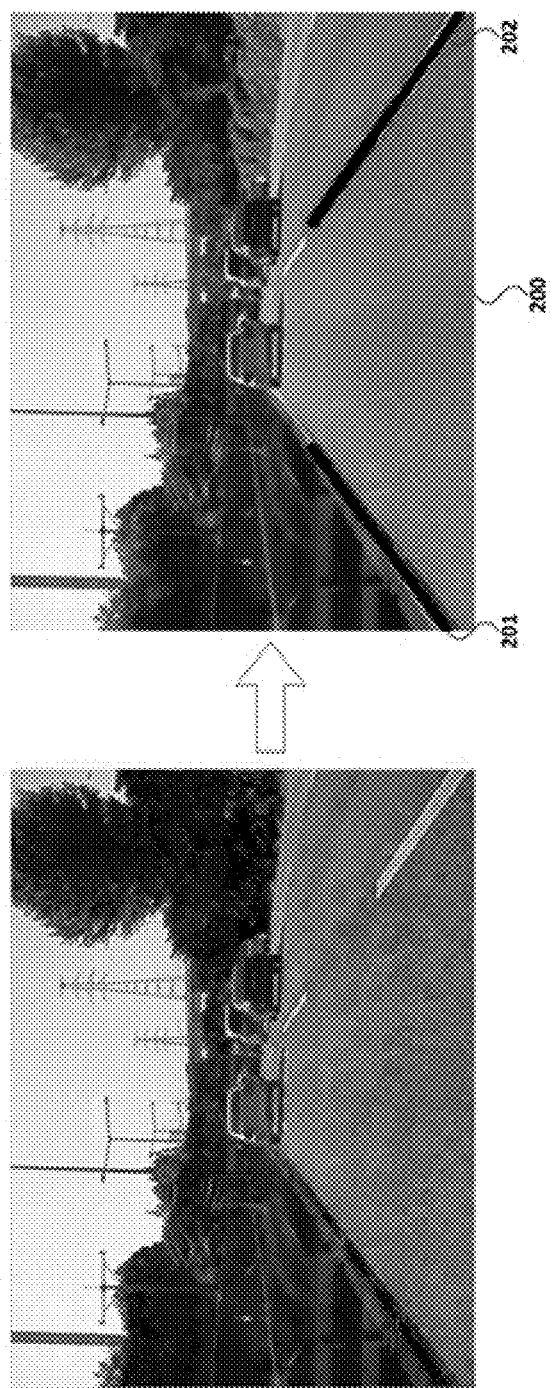

FIG. 5 is a view illustrating the gray image conversion process and the line region detection process.

Referring to FIG. 5, an initially-input driving image may be converted into a gray image 200 and linear line regions 201 and 202 may be detected through a line detection algorithm, such as an edge detection or the like. The line region may be divided into a left-sided line region 201 and a right-sided line region 202 on the basis of the driving direction of the vehicle.

Description will be back to FIG. 4.

Afterwards, when the line region is detected, the electronic apparatus 100 sets a region of interest (ROI) of a line type (hereinafter, referred to as a line type ROI) based on the line region (S205). The line type ROI may refer to a portion of the driving image, which includes a line for determining a type and color of a line, and a predetermined surrounding of the line.

Figure 6:

In more detail, FIG. 6 illustrates the line type ROI in the gray image.

As illustrated in FIG. 6, each of line type ROIs 210 and 220 may include the detected line region and a part of a surrounding region thereof. Also, the line type ROIs may be classified into a left-sided line type ROI 210 and a right-sided line type ROI 220 on the basis of the driving direction of the vehicle.

For example, the detected line region may generally be formed in a linear shape. When expressed by an equation, such as y=a*x+b, the line type ROI may be indicated as a region including both of y=a*x+b+m and y=a*x+b−m. This is an algorithm for generating detailed various driving line information, unlike the conventional line detection algorithm. The driving line information generation module 180 may set the ROI by extending the detected linear line region up to its surrounding region.

Referring back to FIG. 4, afterwards, the electronic apparatus 100 performs binary coding for each line type ROI (S207), and map the binary-coded gray image to a one-dimensional region (S209). The electronic apparatus 100 then identifies a line type using at least one of time continuity and velocity (S211).

The driving line information generation module 180 may extract the gray image of the line type ROI from the converted gray image, and perform the binary coding for the gray image. A reference value for the binary coding may be decided based on an average brightness value of the gray image of the ROI. Accordingly, the driving line information generation module 180 may obviously identify only a portion determined as a line from the gray image.

The driving line information generation module 180 may map each line (left-sided and right-sided) identified from the binary-coded gray image to the one-dimensional region. The driving line information generation module 180 may analyze a pattern of each line mapped to the one-dimensional region, thereby identifying the line type.

In more detail, FIG. 7 illustrates the binary coding for the line type ROI and the one-dimensional mapping in the gray image.

As illustrated in FIG. 7, when the binary coding for the line type ROI is performed, a binary-coded image 300 may be obtained. In the binary-coded image 300, portions indicated with a white color, except for the other portion in a black color, may be identified as lines.

Each line identified in the binary-coded image 300 may be mapped to a one-dimensional region. The driving line information generation module 180 may easily determine the line type using an image 310 mapped to the one-dimensional region.

For example, the driving line information generation module 180 may determine whether the line type is a dashed line or a solid line on the basis of a starting point and a length characteristic of each one-dimensionally mapped line. Also, the driving line information generation module 180 may determine the dashed line or the solid line by using time continuity and velocity of each one-dimensionally mapped line. The driving line information generation module 180 may decide the dashed line or the solid line primarily according to the starting point and the length characteristic, and finally decide the dashed line or the solid line secondarily according to the time continuity and velocity.

In more detail, the driving line information generation module 180 may compare line lengths according to the positions of the starting points of the respective lines, so as to decide the dashed line or the solid line. In this instance, the driving line information generation module 180 may determine the dashed line or the solid line merely by one image frame.

Also, the driving line information generation module 180 may more obviously determine the dashed line or the solid line according to whether or not each line is formed continuously on the time basis. For example, the driving line information generation module 180 may preset a degree of continuity according to a line movement velocity within an image, and determine each line as the dashed line when the continuity of the line is lower than a preset continuity degree value.

Therefore, in accordance with the embodiment disclosed herein, the dashed line or the solid line can be predetermined through one frame, and the predetermination can be verified through continuous frames, thereby determining the final line type.

Referring back to FIG. 4, the electronic apparatus 100 detects a color of the type-identified line portion from the original color image data (S213).

The driving line information generation module 180 may detect a color of a portion corresponding to the type-identified line by analyzing the color image, and classify the color. For example, the driving line information generation module 180 may classify the detected color into a white, yellow or blue color.

Afterwards, the electronic apparatus 100 generates driving line information on the basis of the identified line type and the classified color (S215), and performs necessary processing according to the generated driving line information (S217).

FIG. 8 is an exemplary view illustrating driving line information generated by an electronic apparatus in accordance with one exemplary embodiment of the present invention.

As illustrated in FIG. 8, driving line information may include information related to at least one of a line position, a line type or a line color, and be configured in the form of a table. The driving line information of FIG. 8 is merely illustrative, and it may be obvious that other information may be added to the driving line information or the driving line information may be changeable.

As illustrated in FIG. 8, a line according to a line position may be a left-sided line or a right-sided line. The line type may be a dashed line or a solid line according to its pattern. Also, the line color may be one of a yellow, white or blue color. However, the type and color of the line may be designed with different values according to traffic regulations of each country.

FIGS. 9 to 11 are views illustrating a processing method according to driving line information in an electronic apparatus in accordance with one embodiment disclosed herein.

FIG. 9 is a flowchart illustrating a process of guiding a driving lane change in the electronic apparatus according to the one embodiment disclosed herein.

As illustrated in FIG. 9, first, the electronic apparatus 100 generates driving line information (S303). The driving line information may be generated according to the method illustrated in FIG. 4.

The electronic apparatus 100 identifies a current lane position according to the driving line information (S305), and guides a driving lane change according to the lane position (S307).

As aforementioned, the controller 170 of the electronic apparatus 100 may identify the current lane position according to a current driving lane, which has been determined by the driving lane determination module 185, and guide the lane change when it is required to guide the driving lane change according to the lane position.

FIG. 10 illustrates a lane information table for determining the driving lane. The driving lane determination module 185 may determine a relative lane position on the basis of a center line by comparing the driving line information with the lane information table, and output the determination result to the controller 170.

Here, the relative lane position may be one of a left-sided lane (or passing lane), a middle lane and a right-sided lane, and be designated in a different manner according to traffic regulations of each country. Therefore, the lane information table may include information related to a driving lane which is decided according to a country, a type and color of a left-sided line and a type and color of a right-sided line.

Therefore, the driving lane determination module 185 may determine the lane position based on the driving line information generated on the basis of the currently-driving direction of the vehicle. For example, in case where the country is set to Korea, when a left-sided line is a yellow solid line and a right-sided line is a white dashed line, the driving lane determination module 185 may determine that the driving lane is the passing lane (left-sided lane), which is the closest to the center line. When the left-sided line is a white dashed line and the right-sided line is a white solid line, the driving lane determination module 185 may determine the right-sided lane as the driving lane. Here, the table of FIG. 10 is merely illustrative, and may be set to different values according to countries or situations.

The controller 170 may guide the lane change based on the determined lane position. For example, upon guiding the lane change through a navigation device, the controller 170 may determine in advance whether or not it is necessary to change a lane according to a lane position, before arriving at a turn point on a navigating route, and notify the lane change to a user.

In accordance with the embodiment disclosed herein, the relative lane position can be obviously distinguished by compensating for the conventional simple lane recognition. Consequently, the controller 170 may continuously induce the lane change to enter a turn-available lane, in notifying the lane change.

FIG. 11 illustrates a method of warning a line departure according to driving line information of the electronic apparatus 100.

As illustrated in FIG. 11, first, the electronic apparatus 100 generates driving line information (S403). The driving line information may be generated by the method illustrated in FIG. 4.

The electronic apparatus 100 then identifies line types and shapes of lines at both sides of the vehicle on the basis of a currently-driving direction of the vehicle according to the driving line information (S405).

Afterwards, upon a line departure, the electronic apparatus 100 selects and outputs an appropriate line departure warning according to a line type and shape of the departed line (S407).

As aforementioned, the controller 170 of the electronic apparatus 100 may select the appropriate line departure warning and output it to the user, according to the types of the lines at both sides of the driving lane of the vehicle, which have been identified based on the driving line information. When the electronic apparatus 100 provides a line departure warning function, the controller 170 may provide a different type of warning according to a type and shape of a departed line. For example, controller 170 may select a different warning image or warning sound for output when the vehicle violates a center line, a white solid line, a white dashed line or a blue line.

For the lane change notification or the line departure warning illustrated in FIGS. 9 to 11, it may be provided on the basis of the aforementioned augmented reality. In this instance, the controller 170 may cooperate with the augmented reality interface module 190, to generate a line information interface and output the generated line information interface through the output unit 140.

Meanwhile, the embodiment disclosed herein exemplarily illustrates that the electronic apparatus 100 includes the driving line information generation module 180 and the driving lane determination module 185. However, each module may also be located in an external device or an external server so as to operate independently. For example, the controller 170 may transmit a driving image to an external server, and the external server may responsively generate driving line information or determine a driving lane to transmit to the controller 170.

Meanwhile, the control method for the electronic apparatus according to the various embodiments disclosed herein may be implemented into program codes so as to be provided to each server or apparatus in a state of being stored in a non-transitory computer-readable medium.

The non-transitory computer-readable medium does not refer to a medium, such as a register, a cache, a memory or the like, in which data is stored for a short term of time, but a medium in which data is semi-permanently stored and readable by a device. In detail, those aforementioned various applications or programs may be provided by being stored in a non-transitory computer-readable medium, such as CD, DVD, hard disk, Blue ray disk, USB, memory card, ROM and the like.

Also, the foregoing description has been given of the preferred embodiments. However, the present invention is not limited by those preferred embodiments, and those skilled in the art will appreciate that various modifications, additions and substitutions are possible, without departing from essential characteristics of the invention. Also, the modifications and the like should not be understood individually apart from the technical ideas or expectation of the present invention.

What is claimed is:

1. A method for controlling an electronic apparatus, the method comprising:
    receiving image data including a driving image of a vehicle from a camera;
    identifying line region image data from the image data;
    generating driving line information from the identified line region image data,
    wherein the driving line information corresponds to information on each line at both sides of a currently-driving lane of the vehicle in the driving image;
    selecting a line departure warning from a plurality of line departure warnings in response to a type and a color of each line at both sides of the currently-driving lane of the vehicle, which is identified from the driving line information; and
    outputting the selected line departure warning,
    wherein the generating of the driving line information comprises:
        determining whether the type of each line at both sides of the currently-driving lane of the vehicle is a dashed line or a solid line based on a line length of each line; and
        verifying the determined type of each line according to whether or not each line is continuously formed with respect to time in a plurality of frames,
    wherein the selecting of the line departure warning comprises:
        selecting a first line departure warning from the plurality of line departure warnings if the vehicle moves out of a first line; and
        selecting a second line departure warning from the plurality of line departure warnings if the vehicle moves out of a second line, and
    wherein the first line and the second line are lines in which at least one of the type and the color are different, and the first line departure warning and the second line departure warning are different warning images or warning sounds.

2. The method of claim 1, wherein the generating of the driving line information further comprises:
    performing binary coding for the identified line region image data; and
    acquiring line type information from the binary-coded image data.

3. The method of claim 2, wherein the acquiring of the line type information comprises:
    analyzing the binary-coded image data by using at least one of time continuity information and velocity information both related to each line, and
    identifying whether or not a type of each line of the currently-driving lane of the vehicle is a dashed line or a solid line.

4. The method of claim 1, wherein the driving line information comprises line color information corresponding to each line located at both sides of the currently-driving lane of the vehicle.

5. The method of claim 1, further comprising:
    identifying a position of the currently-driving lane of the vehicle from the driving image on the basis of the driving line information; and
    outputting lane guide information on the basis of the position of the currently-driving lane.

6. The method of claim 1, further comprising:
    identifying a position of the currently-driving lane of the vehicle from the driving image on the basis of the driving line information; and
    outputting a lane change notification according to a navigating route of the vehicle and the position of the currently-driving lane.

7. A method for controlling an augmented reality-based vehicle information notification apparatus, the method comprising:
    receiving image data including a driving image of a vehicle from a camera;
    identifying line region image data from the image data;
    generating driving line information related to the vehicle from image data of the identified line region image data;
    selecting a line departure warning from a plurality of line departure warnings in response to a type and a color of each line at both sides of the currently-driving lane of the vehicle, which is identified from the driving line information;
    generating a line information interface overlaid on the augmented reality according to the selected line departure warning; and
    outputting the generated line information interface through the augmented reality,
    wherein the generating of the driving line information comprises:
        determining whether the type of each line at both sides of the currently-driving lane of the vehicle is a dashed line or a solid line based on a line length of each line; and
        verifying the determined type of each line according to whether or not each line is continuously formed with respect to time in a plurality of frames,
    wherein the selecting of the line departure warning comprises:
        selecting a first line departure warning from the plurality of line departure warning if the vehicle moves out of a first line; and
        selecting a second line departure warning from the plurality of line departure warning if the vehicle moves out of a second line, and
    wherein the first line and the second line are lines in which at least one of the type and the color is different, and the first line departure warning and the second line departure warning are different warning images or warning sounds.

8. The method of claim 7, further comprising performing a lane change notification using the line information interface according to the driving line information and navigating route information.

9. An electronic apparatus comprising:
a communication unit configured to receive image data including a driving image of a vehicle from a camera;
a driving line information generation module configured to identify line region image data from the image data, and to generate driving line information from the identified line region image data, wherein the driving line information corresponds to information on each line at both sides of a currently-driving lane of the vehicle in the driving image; and
a controller configured to select a line departure warning from a plurality of line departure warnings according to a type and a color of each line at both sides of the driving lane of the vehicle, which is identified from the driving line information,
wherein an output unit is configured to output the line departure warning,
wherein the driving line information generation module determines whether the type of each line at both sides of the currently-driving lane of the vehicle is a dashed line or a solid line based on a line length of each line, and verifies the determined type of each line according to whether or not each line is continuously formed with respect to time in a plurality of frames,
wherein the controller further configured to:
select a first line departure warning from the plurality of line departure warnings if the vehicle moves out of a first line; and
select a second line departure warning from the plurality of line departure warnings if the vehicle moves out of a second line, and
wherein the first line and the second line are lines in which at least one of the type and the color are different, and the first line departure warning and the second line departure warning are different warning images or warning sounds.

10. The apparatus of claim 9, wherein the driving line information comprises line type information corresponding to each line located at both sides of the currently-driving lane of the vehicle.

11. The apparatus of claim 9, wherein the driving line information generation module performs binary coding for the identified line region image data, and acquires line type information from the binary-coded image data.

12. The apparatus of claim 11, wherein the driving line information generation module analyzes the binary-coded image data by using at least one of time continuity information and velocity information both related to each line, and identifies whether or not a type of each line of the currently-driving lane of the vehicle is a dashed line or a solid line.

13. The apparatus of claim 9, wherein the driving line information comprises line color information corresponding to each line located at both sides of the currently-driving lane of the vehicle.

14. The apparatus of claim 9, wherein the controller identifies a position of the currently-driving lane of the vehicle in the driving image on the basis of the driving line information, and
wherein the apparatus further comprises an output unit configured to output lane guide information on the basis of the position of the currently-driving lane.

15. The apparatus of claim 9, wherein the controller identifies a position of the currently-driving lane of the vehicle in the driving image on the basis of the driving line information, and
wherein the apparatus further comprises an output unit configured to output a lane change notification according to a navigating route of the vehicle and the position of the currently-driving lane.

16. A non-transitory storage medium having a program recorded therein, the program provided to execute in a computer a method disclosed in claim 1.

* * * * *